(12) United States Patent
Sann et al.

(10) Patent No.: US 10,201,769 B2
(45) Date of Patent: Feb. 12, 2019

(54) FILTER DEVICE

(71) Applicant: Hydac Filtertechnik GmbH, Sulzbach/Saar (DE)

(72) Inventors: Norbert Sann, Riegelsberg (DE); Dirk Röder, Saarbrücken (DE)

(73) Assignee: HYDAC FILTERTECHNIK GMBH, Sulzbach/Saar (DE)

(*) Notice: Subject to any disclaimer, the term of this patent is extended or adjusted under 35 U.S.C. 154(b) by 0 days.

(21) Appl. No.: 13/261,908

(22) PCT Filed: Nov. 28, 2012

(86) PCT No.: PCT/EP2012/004902
§ 371 (c)(1),
(2) Date: May 29, 2014

(87) PCT Pub. No.: WO2013/083246
PCT Pub. Date: Jun. 13, 2013

(65) Prior Publication Data
US 2014/0284265 A1    Sep. 25, 2014

(30) Foreign Application Priority Data
Dec. 8, 2011 (DE) .......................... 10 2011 120 680

(51) Int. Cl.
*B01D 27/08* (2006.01)
*B01D 35/30* (2006.01)
(Continued)

(52) U.S. Cl.
CPC ............. *B01D 27/08* (2013.01); *B01D 29/21* (2013.01); *B01D 29/96* (2013.01); *B01D 35/30* (2013.01);
(Continued)

(58) Field of Classification Search
CPC ........ B01D 27/06; B01D 27/08; B01D 29/96; B01D 35/30; B01D 29/21; B01D 2201/291; B01D 2201/34; B01D 2201/40
(Continued)

(56) References Cited

U.S. PATENT DOCUMENTS 4,157,144 A * 6/1979 Weiler et al. ................. 215/252
4,719,012 A   1/1988 Groezinger
(Continued)

FOREIGN PATENT DOCUMENTS

| DE | 11 89 520 A | 3/1965 |
|---|---|---|
| DE | 10 2004 029 225 A1 | 1/2006 |
| WO | WO 02/16004 A1 | 2/2002 |

*Primary Examiner* — Heidi R Kelley
*Assistant Examiner* — Akash K Varma
(74) *Attorney, Agent, or Firm* — Wenderoth, Lind & Ponack, L.L.P.

(57) ABSTRACT

A filter device has a filter element (3) in a filter housing (1). Corresponding threads (23, 33) form a screw connection between a housing cover (5) of the filter housing (1) and the filter element (3). A seal (29, 35) is between the filter element (3) and the housing cover (5). The screw connection is formed by threads (33) on a connecting pipe piece (31) that is part of an end cap (17) of the filter element (3) and that extends into the inner filter cavity (22) and by the threads (23) of the housing cover (5). The housing cover threads (23) are on a receiving pipe piece (21) formed by a separate component attached to the housing cover (5).

17 Claims, 3 Drawing Sheets

(51) Int. Cl.
*B01D 29/21* (2006.01)
*B01D 29/96* (2006.01)

(52) U.S. Cl.
CPC .... *B01D 2201/291* (2013.01); *B01D 2201/34* (2013.01); *B01D 2201/40* (2013.01)

(58) Field of Classification Search
USPC .......................................................... 210/450
See application file for complete search history.

(56) References Cited

U.S. PATENT DOCUMENTS

| | | | |
|---|---|---|---|
| 6,481,580 B1* | 11/2002 | Amstutz et al. | 210/440 |
| 6,569,329 B1* | 5/2003 | Nohren, Jr. | B01D 29/15 |
| | | | 210/282 |
| 2008/0210618 A1* | 9/2008 | Kiedaisch | B01D 36/001 |
| | | | 210/321.61 |
| 2011/0073537 A1* | 3/2011 | Allott et al. | 210/232 |

* cited by examiner

FILTER DEVICE

FIELD OF THE INVENTION

The invention relates to a filter device having at least one filter element that can be accommodated in a filter housing and having a retaining device releasably securing the filter element in the filter housing. Corresponding threads form a screw connection between a housing cover of the filter housing and the filter element. The screw connection is formed by threads situated at least partially in the interior of the filter element. The thread belonging to the filter element is situated on a connecting piece being a component of an end cap of the filter element and extending into the interior filter cavity of the filter element. The thread belonging to the housing cover is situated on a receiving pipe piece on the housing cover and can be screwed to the connecting piece of the filter element. At least one sealing element seals the outside of the receiving connection with respect to the inside of the connecting pipe piece of the filter element.

BACKGROUND OF THE INVENTION

Filter devices for accommodating filter elements are available on the market in a variety of embodiments. Such filter devices eliminate a not insignificant amount of the manufacturing cost for the design of the retaining device for releasably securing the filter element inside the respective housing as well as for the sealing device for sealing the interior of the filter element with respect to the filter housing.

With a filter device of the generic type disclosed in the document DE 10 2004 029 225 A1, the screw connection has an internal thread incorporated directly into the housing cover, into which an external thread can be screwed. The external thread is formed on a connecting piece protruding outward on the respective filter element. The sealing device is formed by an axially protruding sealing edge surrounding the connecting piece concentrically. This sealing edge forms the seal due to the pressure applied to the sealing edge when the screw connection is tightened. This solution is problematical inasmuch as the security of the seal depends on the pressing force acting on the sealing edge, and requires strong tightening of the screw connection. The strong tightening requires the end cap of the filter element to be designed to have dimensional stability to prevent deformation of the end cap when the screw connection is tightened strongly. Problems arise in this regard with the usual design of end caps made of a plastic material.

DE 11 89 520 discloses a disposable filter for fluids. A replaceable filter element having an end cap designed for conducting fluid to the clean side as well as to the crude side can be disposed in a housing. The end cap can be screwed to a pipe connection on the filter housing. Furthermore, a peripheral sealing element is provided in a radially outer region between the filter housing and the end cap.

U.S. Pat. No. 4,719,012 discloses a screw-on disposable filter element. A sealing configuration is provided on a pipe connection for sealing the fluid connection from the inside of the filter element with respect to the pipe connection.

SUMMARY OF THE INVENTION

An object of the invention is to provide an improved filter device that will ensure a reliable securing of the filter element and reliable sealing of the filter element with respect to the housing cover, as well as being simple and inexpensive to manufacture.

This object is basically achieved according to the invention by a filter device having, in the inlet area of the connecting piece of the end cap, at least one thread-free section that forms a sealing region on which at least one sealing element forms the seal with the receiving pipe piece of the housing cover.

Since the screw connection is formed by threads situated at least partially in the interior of the filter element, this structure yields the advantageous possibility of providing a sealing configuration for the sealing device. The sealing configuration can then be assigned to the threads situated in the interior of the filter element, instead of an axial seal compressed by tightening of the screw connection when the axial seal is provided on the outside of the end cap. Therefore, a radial gasket, whose sealing effect does not depend on a sealing force that is to be created by tightening the screw connection strongly enough, may be used in a structurally simple manner, for example.

The thread belonging to the filter element is situated on a connecting piece that extends as part of an end cap of the filter element into its inner filter cavity.

The thread belonging to the housing cover is situated to particular advantage on a receiving pipe piece on the housing cover that can be screwed onto the connecting piece of the filter element.

The sealing device has at least one sealing element that seals the outside of the receiving pipe piece with respect to the inside of the connecting piece of the filter element.

In especially advantageous exemplary embodiments, the receiving pipe piece is formed by a separate part in the form of a pipe piece mounted on the housing cover. This pipe piece opens up the advantageous possibility of specifying the use of filter elements of a certain specification by providing the respective housing cover with receiving pipe pieces in the form of specially designed pipe pieces. For this purpose, pipe pieces with specially designed threads may be used, permitting a screw connection with only one fitting thread of the connecting piece of the filter element. This design prevents the use of inexpensive elements as replacement parts, which, besides their fundamentally poor quality, can often result in malfunctions because of their less specialized adaptation to the medium that is to be filtered.

The configuration may advantageously be obtained with the thread on the receiving pipe piece being formed by an external thread and the thread on the connecting pipe piece being formed by an inside thread. Furthermore, the thread pitch of the thread may be designed as a round thread.

For the seal between the outside of the receiving pipe piece and the inside of the connecting pipe piece of the filter element, an annular groove may be formed for a respective sealing element in the sealing region of the receiving pipe piece.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
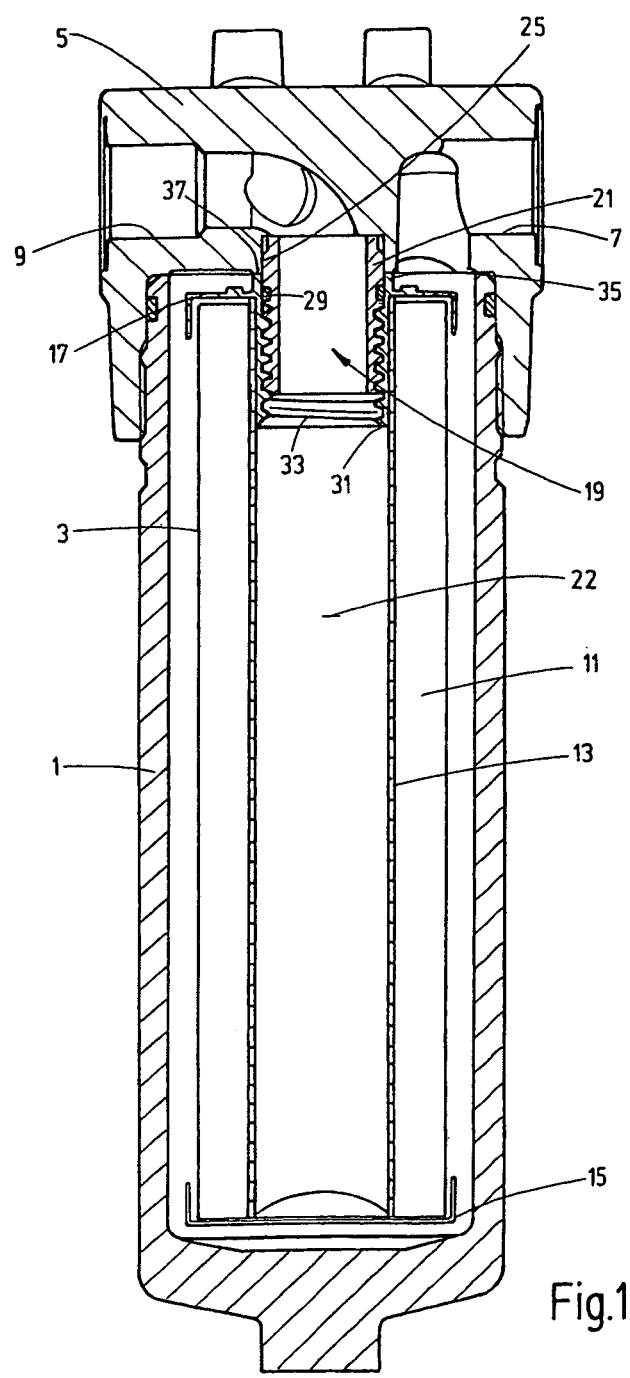
FIG. 1 is a side elevational view in section of a filter device according to an exemplary embodiment of the invention.

The exemplary embodiment, illustrated as a whole in FIG. 1, has a closed pot-shaped filter housing 1 on the bottom side that accommodates a filter element 3. The filter housing 1 is sealed on the end at the top of the drawing by a housing cover 5. The housing cover is designed as a screw cover and has fluid connections, with one fluid connection forming the housing inlet 7 for the unfiltered inflow of fluid and the other fluid connection forming the housing outlet 9 for discharging the filtrate. The filter element 3, designed in the manner of a filter cartridge, has a filter medium 11 surrounding a fluid-permeable supporting tube 13 in the customary manner with such filter elements. The filter medium preferably is constructed of a multilayer filter mat, pleated in a star-like or stellate pattern. The filter medium 11 is held at its ends by a lower end cap 15 and an upper end cap 17 in the drawing, in the manner customary with such filter elements 3. The retaining device for releasably securing the filter element 3 in the filter housing 1 is formed by a screw connection between the upper end cap 17 and the housing cover 5.

Figure 2:
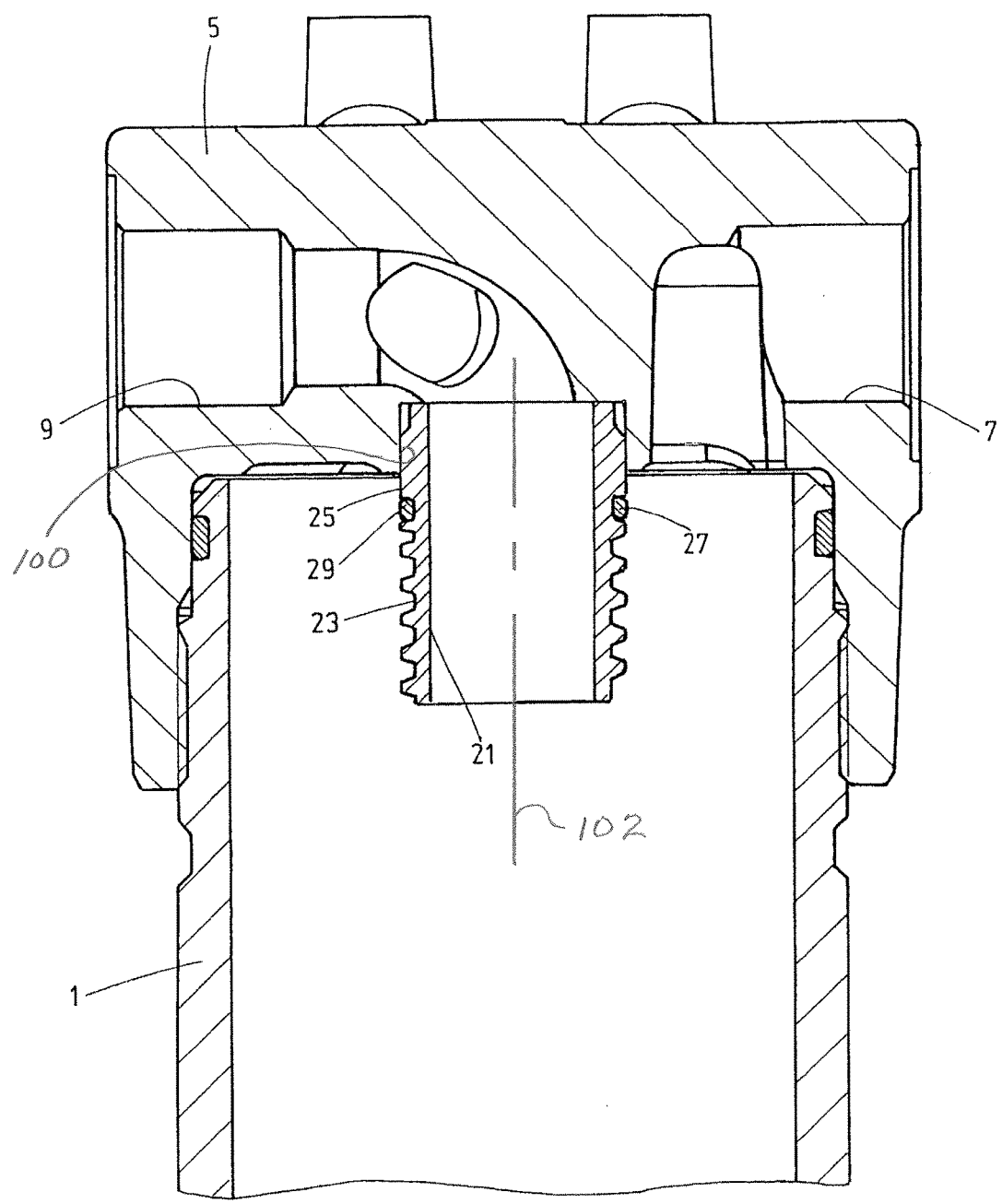
FIG. 2 is a partial, side elevational view in section, on a larger scale in comparison with FIG. 1, of just the part of the filter housing of the exemplary embodiment of FIG. 1 adjacent to the housing cover without the filter element inserted.
Figure 3:
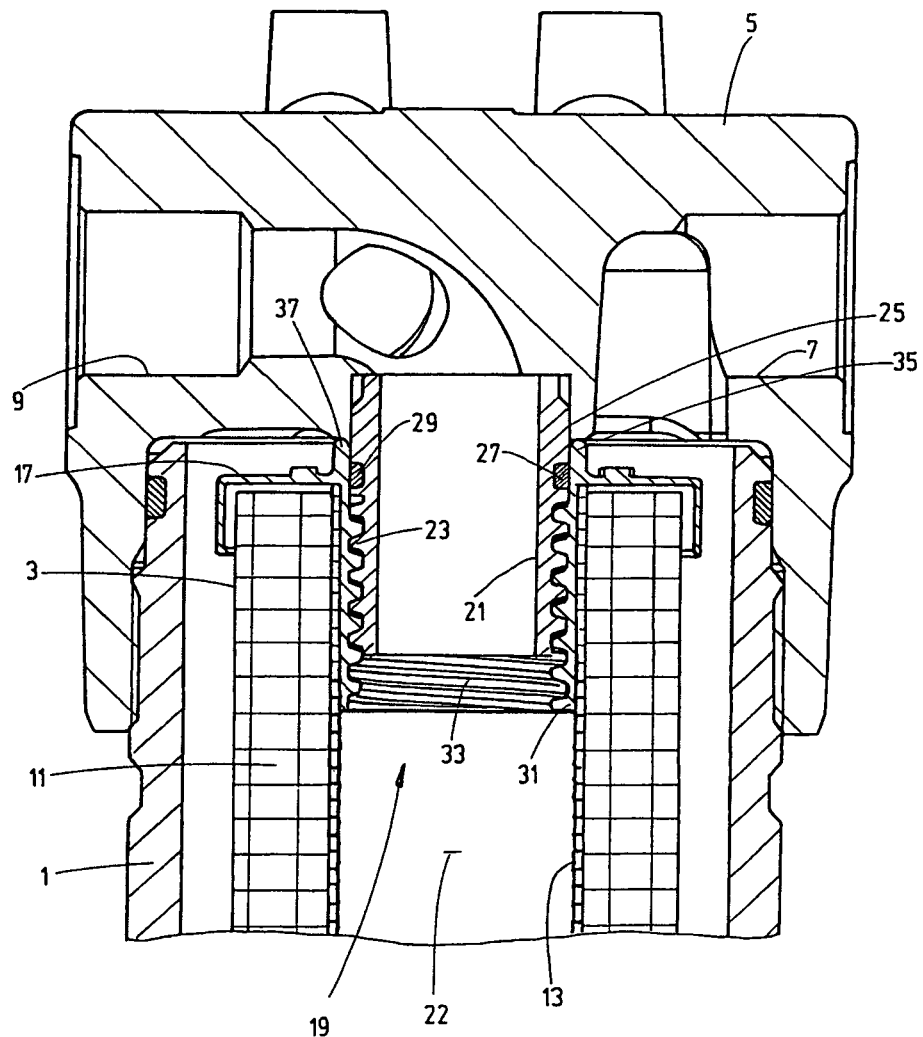
FIG. 3 is an enlarged, partial side elevational view in section of the filter device of FIG. 1 with the filter element inserted.

The design of this retaining device 19 in FIGS. 1 and 3, can be seen more clearly in FIGS. 2 and 3 in particular. The component of the retaining device 19 belonging to the housing cover 5 is formed by a receiving pipe piece in the form of a pipe piece 21 that protrudes axially from the housing cover 5 into the interior of the filter housing 1. The pipe piece 21 establishes the fluid connection between the interior filter cavity 22 surrounded by the supporting pipe 13 in the case of the filter element 3 in the filter housing 1 (see FIG. 1). The inner filter cavity forms the clean side in filtration and establishes the connection to the housing outlet 9 of the housing cover 5. The pipe piece 21, attached to the housing cover 5 by pressing and receiving the pipe piece into a recess 100 in the housing cover 5, for example, has a thread 23 in the form of an external thread, starting from its open end, with the thread pitch forming a round thread (see FIG. 2). The recess 100 extends along a longitudinal axis 102. In a thread-free section 25 connected to the upper end of the thread 23, an annular groove 27 forms the seat for a ring-shaped sealing element 29, which sealing element is part of a sealing device that is assigned to the retaining device 19 and performs the sealing function between the filter element 3 and the housing cover 5. As shown in FIGS. 1-3, the receipt and pressing of the thread-free section 25 in the recess 100 provides a mating coupling between the pipe piece 21 and the housing cover 5.

The component of the retaining device 19 assigned to the filter element 3 is formed by a connecting pipe piece 31 integrally molded on the upper end cap 17 as a one-piece component. The connecting pipe piece 31 extends into the interior filter cavity 22 of the filter element 3 and has a thread 33 having a thread pitch, starting from the inner end corresponding to the thread 23 of the pipe piece 21. A thread-free section 35 forms the sealing device in cooperation with the sealing element 29 on the thread-free section 25 of the pipe piece 21 and is connected to the upper end of the thread 33.

As shown best in FIG. 3, the upper end of the thread-free section 35 of the end cap 17 is situated at 37 (FIG. 3) on the housing cover 5 in the case of the filter element 3 situated in the filter housing 1 and secured by screw connection. The sealing element 29 directed toward the thread-free section 35 of the connecting piece 31 seals the filter cavity 22 with respect to the pipe piece 21. Filter cavity 22 forms the clean side in filtration and is sealed with respect to the housing cover 5.

Due to the position of the tilter element 3 being secured by screw connection to the receiving pipe piece on the housing cover 5, i.e., to the thread of the pipe piece 21, this connection ensures that only a filter element 3 conforming to a given specification can be installed in the filter housing 1. The design of the retaining device according to the invention, with a pipe piece 21 serving as the receiving pipe piece, provides the possibility of establishing the filter device for different intended purposes, for the use of a suitable type of filter element 3, which is provided for this purpose, and to do so with the same design of the filter device in each case by providing the housing cover 5 with a pipe piece 21 that fits the given type of filter element 3.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
a filter housing having a housing cover, said housing cover having a receiving pipe piece with a specifically designed first thread thereon and at least one thread-free section thereon extending axially on a lateral side thereof, said receiving pipe piece being formed by a separate part from said housing cover and being received in a recess in said housing cover providing a mating coupling between said receiving pipe piece and said housing cover;
a filter element received in said filter housing and having a filter medium with an end cap on one axial end of said filter medium, said end cap having a connecting piece extending from said end cap into an interior filter cavity of said filter medium and being a part of said end cap, said connecting piece having a specifically designed second thread thereon that only mates with said first thread and that threadedly engages said first thread to form a threaded connection and to form a retaining device releasably securing said filter element in said filter housing and having an inlet region extending axially on a lateral side thereof and forming a sealing region with said thread-free section; and
a sealing element extending between said inlet region and said thread-free section and forming a seal between said receiving pipe piece and said connecting piece.

2. A filter element according to claim 1 wherein
said first thread is an external thread; and
said second thread is an internal thread.

3. A filter device according to claim 1 wherein
each of said first and second threads have a thread pitch forming a round thread.

4. A filter device according to claim 1 wherein
said thread-free section of said receiving pipe piece comprises an annular groove receiving said sealing element.

5. A filter device according to claim 1 wherein
said housing cover comprises an inlet and an outlet; and
said receiving pipe piece has a fluid passage extending axially therethrough in fluid communication with one of said inlet or said outlet.

6. A filter device according to claim 5 wherein
said housing cover comprises a radially inwardly extending shoulder surrounding a duct in said housing cover connecting said one of said inlet or said outlet to said passage; and
said receiving pipe piece having an axial end abutting said shoulder.

7. A filter device according to claim 6 wherein
said thread-free section extends axially between said first thread and said axial end.

8. A filter device according to claim 1 wherein
said thread-free section of said receiving pipe piece comprises an annular groove in a portion of said receiving pipe piece located outside of said recess, said annular groove receiving said sealing element.

9. A filter device according to claim 8 wherein
said inlet region comprises a cylindrical and untreated surface overlying said sealing element.

10. A filter device, comprising:
a filter housing having a housing cover coupled thereto, said housing cover having a receiving pipe piece with a specifically designed first thread thereon and at least one thread-free section thereon extending axially on a lateral side thereof, said receiving pipe piece being formed by a separate part from said housing cover and being press fit in said housing cover, said housing cover being threaded to said filter housing and having inlet and outlet connections forming a housing inlet receiving an inflow of unfiltered fluid and a housing outlet discharging filtered fluid, respectively;
a filter element received in said filter housing and having a filter medium with an end cap on one axial end of said filter medium, said end cap having a connecting piece extending from said end cap into an interior filter cavity of said filter medium and being a part of said end cap, said connecting piece having a specifically designed second thread thereon that only mates with said first thread and that threadedly engages said first thread to form a threaded connection and to form a retaining device releasably securing said filter element in said filter housing and having an inlet region extending axially on a lateral side thereof and forming a sealing region with said thread-free section; and
a sealing element extending between said inlet region and said thread-free section and forming a seal between said receiving pipe piece and said connecting piece.

11. A filter device according to claim 1 wherein
an outer transverse configuration and dimensions on at least a portion of said thread-free section and an inner transverse configuration and dimensions of said recess provide said mating coupling between said thread free section and said recess.

12. A filter device according to claim 11 wherein
said thread-free section is removably received in said recess.

13. A filter device according to claim 11 wherein
said thread-free section is press fit in said recess.

14. A filter device according to claim 1 wherein
at least a portion of said thread-free section has an outer surface with a shape and dimensions transverse to a longitudinal axis of said thread-free section;
said recess comprises an inner surface with a shape and dimensions transverse to a longitudinal axis of said recess, said shape and dimensions of said outer surface and said shape and dimensions of said inner surface being substantially identical such that said portion of said thread-free section can be tightly received in said recess.

15. A filter device according to claim 14 wherein
said thread-free section is removably received in said recess.

16. A filter device according to claim 14 wherein
said thread-free section is press fit in said recess.

17. A filter device according to claim 1 wherein
said recess has an end surface extending at an angle to a longitudinal axis of said recess; and
said thread-free section has an end surface extending at an angle to a longitudinal axis of said thread-free section, said end surfaces engaging one another.

\* \* \* \* \*